US012640786B2

(12) United States Patent
Sakata

(10) Patent No.: US 12,640,786 B2
(45) Date of Patent: May 26, 2026

(54) MESSAGE RELAY APPARATUS, ONBOARD APPARATUS, COMMUNICATION SYSTEM, MESSAGE RELAY METHOD AND PROGRAM RECORDING MEDIUM

(71) Applicant: NEC Corporation, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 18/280,844

(22) PCT Filed: Mar. 12, 2021

(86) PCT No.: PCT/JP2021/010201
§ 371 (c)(1),
(2) Date: Sep. 7, 2023

(87) PCT Pub. No.: WO2022/190385
PCT Pub. Date: Sep. 15, 2022

(65) Prior Publication Data
US 2024/0162953 A1 May 16, 2024

(51) Int. Cl.
*H04B 7/06* (2006.01)
*H04W 16/28* (2009.01)

(52) U.S. Cl.
CPC .......... *H04B 7/0602* (2013.01); *H04W 16/28* (2013.01)

(58) Field of Classification Search
CPC .............................. H04W 16/28; H04B 7/0602

USPC ......................................................... 375/267
See application file for complete search history.

(56) References Cited

FOREIGN PATENT DOCUMENTS

| | | | |
|---|---|---|---|
| JP | 2020-113227 A | 7/2020 | |
| JP | 2020-188406 A | 11/2020 | |
| JP | 2020-202591 A | 12/2020 | |
| KR | 10-2012-0064938 A | 6/2012 | |
| KR | 20120064938 A * | 6/2012 | |
| WO | WO-2010045966 A1 * | 4/2010 | .......... H04W 72/046 |

OTHER PUBLICATIONS

International Search Report for PCT Application No. PCT/JP2021/010201, mailed on Jun. 1, 2021.

* cited by examiner

*Primary Examiner* — Leila Malek

(57) ABSTRACT

A message relay apparatus includes: a first antenna that has a directivity in a first direction; a second antenna that has a directivity in a second direction different from the first direction; a reception part that can receive a message from a first mobile body, the message being directed to a second mobile body and including distribution request area information; an antenna selection part that selects a selection antenna from the first antenna and the second antenna on a basis of setting information, the setting information defining a relationship between a distribution request area indicated in the distribution request area information and an antenna to be selected as the selection antenna; and a transmission part that transmits the message received by the reception part using the selection antenna.

19 Claims, 17 Drawing Sheets

| MESSAGE TYPE | TRAVELLING DIRECTION | TRANSMISSION REQUEST DIRECTION |
|---|---|---|
| 1-1 | E | F |
| 1-2 | E | R |
| 2-1 | N | F |
| 2-2 | N | R |
| 3-1 | W | F |
| 3-2 | W | R |
| 4-1 | S | F |
| 4-2 | S | R |

FIG. 8

RECEPTION ANTENNA =104

| RECEPTION MESSAGE TYPE | AVAILABILITY (TRANSMISSION ANTENNA) | TRAVELLING DIRECTION | TRANSMISSION DIRECTION |
|---|---|---|---|
| 1-1 | × | E | F(E) |
| 1-2 | O (105) | E | R(W) |
| 2-1 | O (106) | N | F(N) |
| 2-2 | × | N | R(S) |
| 3-1 | O (105) | W | F(W) |
| 3-2 | × | W | R(E) |
| 4-1 | × | S | F(S) |
| 4-2 | O (106) | S | R(N) |

FIG. 9

RECEPTION ANTENNA =104

| RECEPTION MESSAGE TYPE | TRANSMISSION ANTENNA |
|---|---|
| 1-2 | 105 |
| 2-1 | 106 |
| 3-1 | 105 |
| 4-2 | 106 |

RECEPTION ANTENNA =105

| RECEPTION MESSAGE TYPE | TRANSMISSION ANTENNA |
|---|---|
| 1-1 | 104 |
| 2-1 | 106 |
| 3-2 | 104 |
| 4-2 | 106 |

RECEPTION ANTENNA =106

| RECEPTION MESSAGE TYPE | TRANSMISSION ANTENNA |
|---|---|
| 2-2 | 104 or 105 |
| 4-1 | 104 or 105 |

FIG. 10

MSG(1-2)

210

212   200

211

MESSAGE TRANSMISSION PART

MESSAGE CREATION PART

100

5G

TRANSMISSION FROM ANTENNA 105

FIG. 14

RECEPTION ANTENNA =104

| RECEPTION MESSAGE TYPE | AVAILABILITY (TRANSMISSION ANTENNA / BASE STATION) | TRAVELLING DIRECTION | TRANSMISSION DIRECTION |
|---|---|---|---|
| 1-1 | O (100-E) | E | F(E) |
| 1-2 | O (105) | E | R(W) |
| 2-1 | O (106) | N | F(N) |
| 2-2 | O (100-S) | N | R(S) |
| 3-1 | O (105) | W | F(W) |
| 3-2 | O (100-E) | W | R(E) |
| 4-1 | O (100-S) | S | F(S) |
| 4-2 | O (106) | S | R(N) |

FIG. 15

MESSAGE RELAY APPARATUS, ONBOARD APPARATUS, COMMUNICATION SYSTEM, MESSAGE RELAY METHOD AND PROGRAM RECORDING MEDIUM

This application is a National Stage Entry of PCT/JP2021/010201 filed on Mar. 12, 2021, the contents of all of which are incorporated herein by reference, in their entirety.

FIELD

The present invention relates to a message relay apparatus, an onboard apparatus, a communication system, a message relay method and a program recording medium.

BACKGROUND

Vehicle-to-vehicle communication (also called V2V communication; V2V stands for Vehicle-to-Vehicle), which is communication with other vehicles about the status of surrounding vehicles and roads, is being studied. The vehicle-to-vehicle communication can be broadly classified into direct communication using the PC5 interface and communication via a base station using the UU interface.

Patent Literature (PTL) 1 discloses a server which is provided with a distribution area determination part, a transmission target determination part, and an information transmission part. The distribution area determination part determines a distribution area in which a plurality of information distribution target mobile bodies is located. The transmission target determination part selects and determines a unicast transmission target mobile body via a mobile communication base station, on the basis of location information of the plurality of mobile bodies located in the distribution area. The information transmission part performs the unicast transmission of information to the unicast transmission target mobile body via the mobile communication base station. Concretely, the server disclosed in PTL 1, upon receiving information about a hazardous event from a vehicle, determines area to distribute the information about the hazardous event on the basis of a content of the information (see paragraph 0038). Then, it selects a vehicle (mobile body) located in the distribution area on the basis of the location information of the mobile body previously known.

CITATION LIST

Patent Literature

[PTL 1] Japanese Patent Kokai Publication No. JP2020-202591A

SUMMARY

The following analyses have been made by the present inventors. According to a method disclosed in PTL 1, the server determines the distribution area on the basis of the information about the hazardous event received from the vehicle, which causes computational processing in the server, which may cause transmission delay. In addition, the server disclosed in PTL 1 needs to select a vehicle located in the distribution area, after determining the distribution area. This can cause transmission delay. Further, the server disclosed in PTL 1 uses unicast to transmit information about the hazardous event, which can cause a delay due to an execution order of unicast.

It is an object of the present invention to provide a message replay apparatus, an onboard apparatus, a communication system, a message relay method, and a program recording medium that can contribute to reducing transmission delay in communication between mobile bodies via a base station.

According to a first aspect, there is provided a message relay apparatus, including:

a first antenna that has a directivity in a first direction;

a second antenna that has a directivity in a second direction different from the first direction;

a reception part that can receive a message from a first mobile body, the message being directed to a second mobile body and including distribution request area information;

an antenna selection part that selects a selection antenna from the first antenna and the second antenna on a basis of setting information, the setting information defining a relationship between a distribution request area indicated in the distribution request area information and an antenna to be selected as the selection antenna; and a transmission part that transmits the message received by the reception part using the selection antenna.

According to a second aspect, there is provided an onboard apparatus, including:

a means for transmitting message directed to a second mobile body to a message relay apparatus, the message including distribution request area information, wherein the message relay apparatus comprises:

a first antenna that has a directivity in a first direction;

a second antenna that has a directivity in a second direction different from the first direction;

a reception part that can receive a message from a first mobile body, the message being directed to the second mobile body and including distribution request area information;

an antenna selection part that selects a selection antenna from the first antenna and the second antenna on a basis of setting information, the setting information defining a relationship between a distribution request area indicated in the distribution request area information and an antenna to be selected as the selection antenna; and a transmission part that transmits the message received by the reception part using the selection antenna.

According to a third aspect, there is provided a communication system, including:

a message relay apparatus; and an onboard apparatus, wherein the message relay apparatus includes:

a first antenna that has a directivity in a first direction;

a second antenna that has a directivity in a second direction different from the first direction;

a reception part that can receive a message from a first mobile body, the message being directed to a second mobile body and including distribution request area information;

an antenna selection part that selects a selection antenna from the first antenna and the second antenna on a basis of setting information, the setting information defining a relationship between a distribution request area indicated in the distribution request area information and an antenna to be selected as the selection antenna; and a transmission part that transmits the message received by the reception part using the selection antenna, and wherein the onboard apparatus includes a means for transmitting message directed to the second mobile body and including the distribution request area information.

According to a fourth aspect, there is provided a message relay method, performed by a message relay apparatus including a first antenna that has a directivity in a first direction and a second antenna that has a directivity in a second direction different from the first direction, the method including:

receiving a message from a first mobile body, the message being directed to a second mobile body and including distribution request area information;

selecting a selection antenna from the first antenna and the second antenna on a basis of setting information, the setting information defining a relationship between a distribution request area indicated in the distribution request area information and an antenna to be selected as the selection antenna; and transmitting the message received using the selection antenna.

According to a fifth aspect, there is provided a message relay method, performed by an onboard apparatus connected to a message relay apparatus including a first antenna that has a directivity in a first direction and a second antenna that has a directivity in a second direction different from the first direction, the method including:

transmitting a message directed to a second mobile body and including distribution request area information to the message relay apparatus; and causing the message relay apparatus to select a selection antenna from the first antenna and the second antenna on a basis of setting information, the setting information defining a relationship between a distribution request area indicated in the distribution request area information and an antenna to be selected as the selection antenna, and to transmit the message received using the selection antenna.

According to a sixth aspect, there is provided computer programs (hereinafter referred to as "programs") for realizing functions of the message relay apparatus above and the onboard apparatus above.

These programs are inputted to a computer apparatus via an input device or a communication interface from an outside, are stored in a storage device, and cause a processor to drive in accordance with predetermined steps or processings.

These programs can also display, as needed, a processing result including an intermediate state per stage on a display device or communicate with the outside via the communication interface.

For example, the computer apparatus for this purpose typically includes a processor, a storage device, an input device, a communication interface, and a display device as needed, which can be connected to each other via a bus.

In addition, this program can be a recorded in a computer-readable (non-transitory) storage medium.

According to the present invention, it can contribute to reducing transmission delay in communication between mobile bodies via a base station.

BRIEF DESCRIPTION OF DRAWINGS

FIG. 8 is a diagram for describing a processing content for each message type by the base station according to the first example embodiment of the present invention.

FIG. 9 is a diagram illustrating an example of setting information set in the base station according to the first example embodiment of the present invention.

FIG. 10 is a diagram for describing an operation of the base station according to the first example embodiment of the present invention.

FIG. 14 is a diagram for describing a processing content for each message type by the base station according to the third example embodiment of the present invention.

FIG. 15 is a diagram for describing an operation of the base station according to the third example embodiment of the present invention.

EXAMPLE EMBODIMENTS

Figure 1:
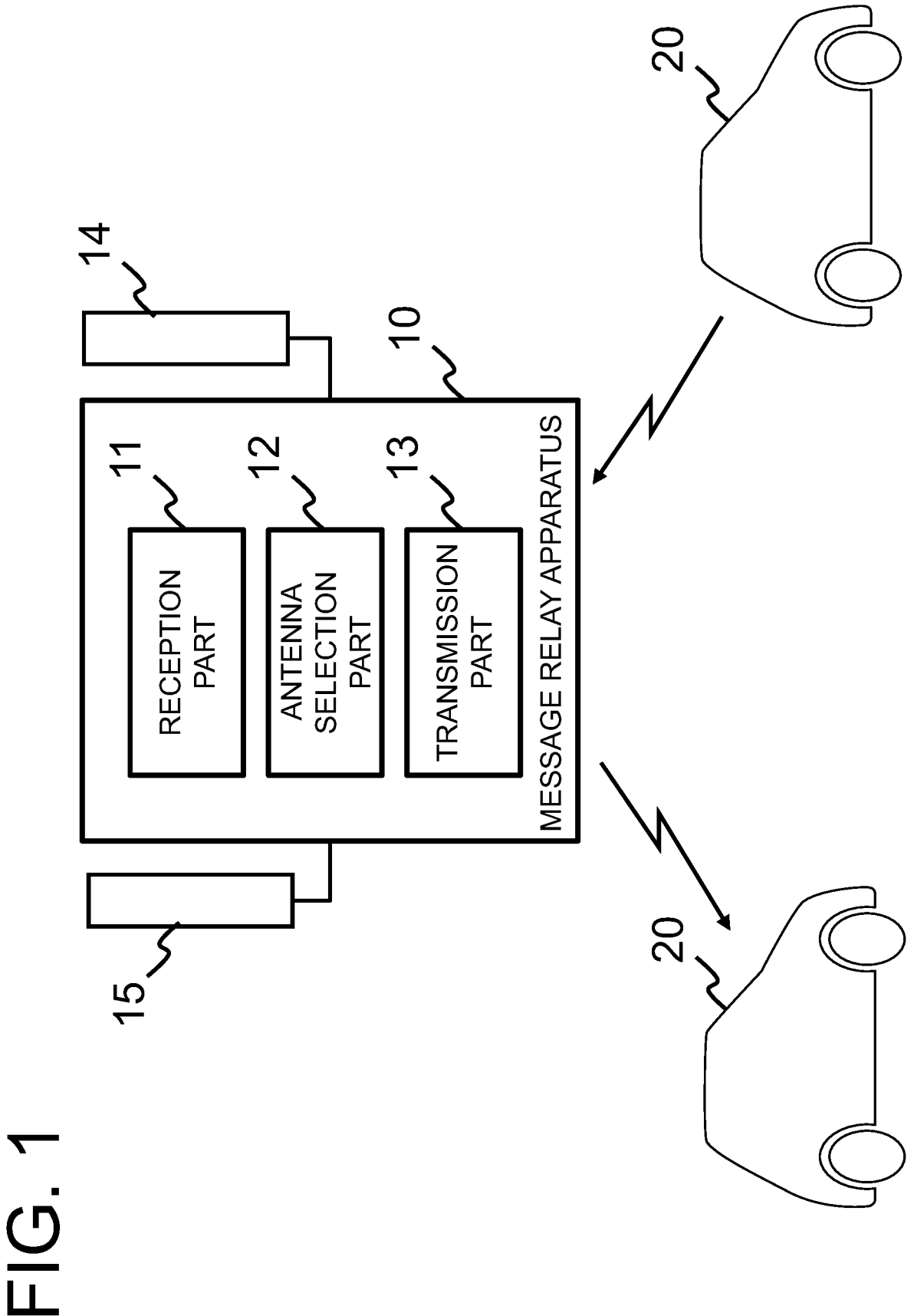
FIG. 1 is a diagram illustrating a configuration of an example embodiment of the present invention.

First, an outline of an example embodiment of the present invention will be described with reference to drawings. It should be noted that drawing reference signs in the outline are given to each element for convenience as an example to facilitate understanding and are not intended to limit the present invention to the illustrated modes. Further, connection lines between blocks in the drawings referred to in the following description can be both bidirectional and unidirectional. A unidirectional arrow schematically shows a main flow of a signal (data) and does not exclude bidirectionality. A program is executed by a computer apparatus, and the computer apparatus is provided with, for example, a processor, a storage device, an input device, a communication interface, and a display device as necessary. Further, the computer apparatus is configured to be able to perform wired or wireless communication with an internal device therein or with an external device (including a computer) via the communication interface. In addition, while a port or an interface is present at an input/output connection point of an individual block in the relevant drawings, illustration of the port or the interface is omitted.

In one example embodiment, as illustrated in FIG. 1, the present invention can be realized by a message relay apparatus 10 provided with a first antenna 14, a second antenna 15, a reception part 11, an antenna selection part 12, and a transmission part 13.

More concretely, the first antenna 14 has a directivity in a first direction. The second antenna 15 has a directivity in a second direction different from the first direction.

The reception part 11 receives from one mobile body (a first mobile body) 20 a message directed to an other mobile body (a second mobile body) including area information for which distribution is requested (distribution request area information) via one of the antenna 14 and the antenna 15. For example, information that directly or indirectly specifies a transmission area (distribution request area) of each of the antenna 14 and the antenna 15 can be used as the distribution request area information. In a case of using information directly specifying thereof, it is possible to use a method which distributes in advance to the mobile body 20 location information thereof and/or arrangement information of a transmission area (distribution request area) corresponding to a traveling section on a road.

The antenna selection part 12 selects an antenna (selection antenna) from the first antenna 14 and the second antenna 14 on a basis of the setting information that defines a relationship between the distribution request area and an antenna to be selected. The antenna selection part 12 does not select the selection antenna when the distribution request area which is not defined in the setting information is set in the message. For example, the setting information may have a simple form such as "the distribution request area 11=transmit using the antenna 14" and "the distribution request area 12=transmit using the antenna 15". Of course, a more sophisticated method of determining a distribution area can also be employed, depending on the message content.

The transmission part 13 transmits the message received by the reception part 11 using the antenna selected by the antenna selection part 12 (the selection antenna).

Figure 2:
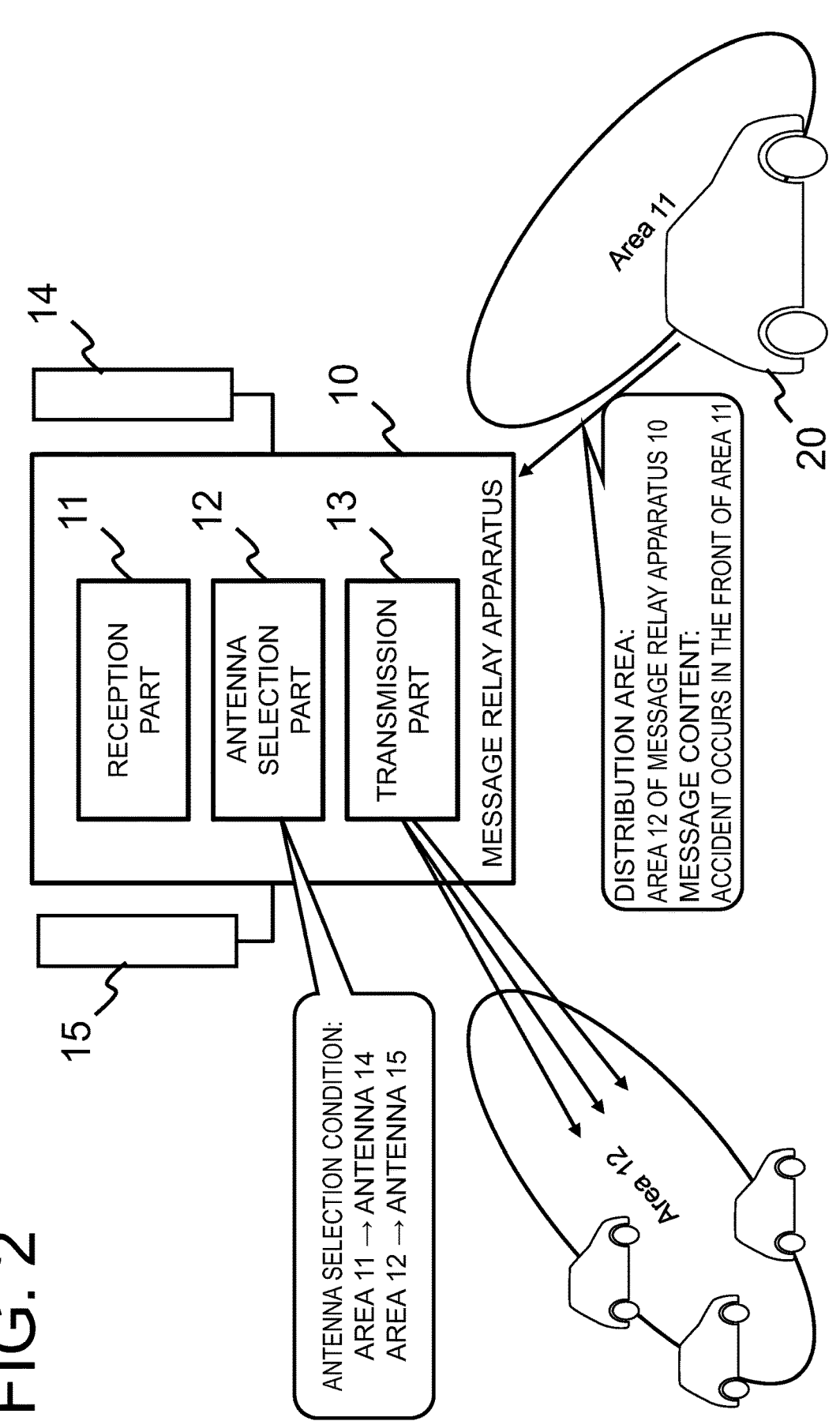
FIG. 2 is a diagram for describing an operation of the example embodiment of the present invention.

FIG. 2 is a diagram for describing an operation of the example embodiment of the present invention. For example, as illustrated in FIG. 2, it is assumed that the mobile body 20 has obtained information to be informed to other mobile bodies. Here, it is assumed, for example, that the mobile body 20 detects that an accident has occurred in a front of an Area 11. In this case, the mobile body 20 transmits a message directed to other mobile bodies including the distribution request area information via broadcast. In the example illustrated in FIG. 2, area 12 (Area 12), which can be transmitted by the antenna 15 of the message relay apparatus 10, is specified as the distribution request area information.

The message relay apparatus 10 that receives such a message directed to other mobile bodies operates as follows. First, the antenna selection part 12 refers to the setting information and selects the antenna 15 corresponding to the distribution request area 12 (Area 12) from the antenna 14 and the antenna 15. Then, the transmission part 13 broadcasts the message received at the reception part 11 using the antenna 15 selected by the antenna selection part 12. Thus, the message transmitted by the mobile body 20 directed to the other mobile bodies is broadcast to the Area 12 using the antenna 15 of the message relay apparatus 10. As a result, the other mobile bodies located in the Area 12 can obtain information that an accident has occurred in the front of the area 11 (Area 11).

Figure 3:
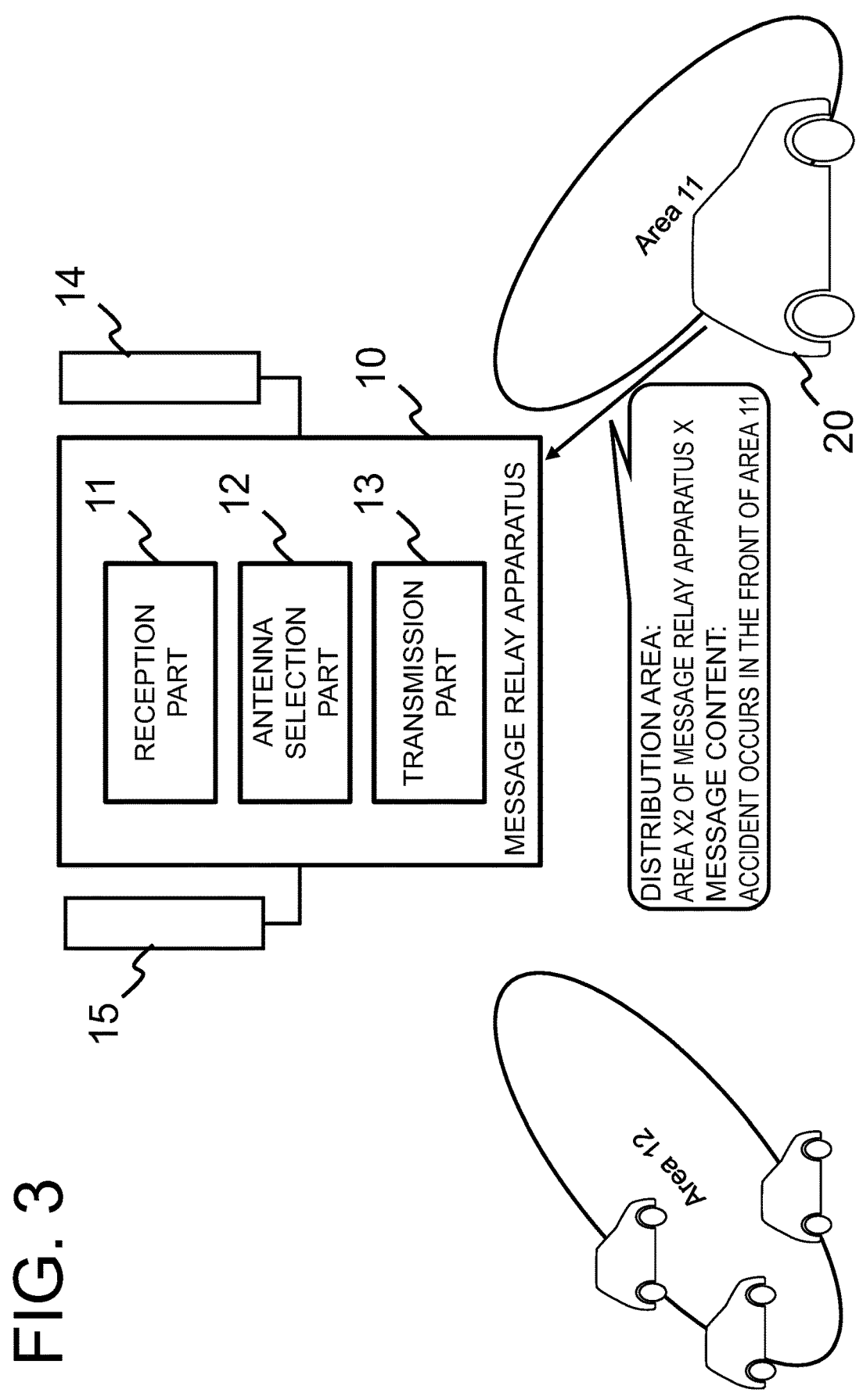
FIG. 3 is a diagram for describing an operation of the example embodiment of the present invention.

On the other hand, there is a case where a distribution request area which is not define in the setting information is set in the distribution request area information. FIG. 3 illustrates the message relay apparatus 10 when the distribution request area set in the distribution request area information is a distribution area X2 of another message relay apparatus X other than the message relay apparatus 10. As illustrated in FIG. 3, when the antenna selection part 12 refers to the setting information to determine that the distribution request area set in the distribution request area information corresponds to neither the antenna 14 nor the antenna 15, it does not select an antenna. In this case, since the antenna selection part 12 does not select the antenna, the transmission part 13 would also suppress a transmission of the message received at the reception part 11.

As described above, according to the present example embodiment, it is possible to reduce transmission delay in communication between mobile bodies via the base station. Further, according to the present example embodiment, when an area which corresponds to neither the antenna 14 nor the antenna 15 is to be the distribution request area, a transmission of a message using broadcast is suppressed. Therefore, radio resources are saved.

First Example Embodiment

Figure 4:
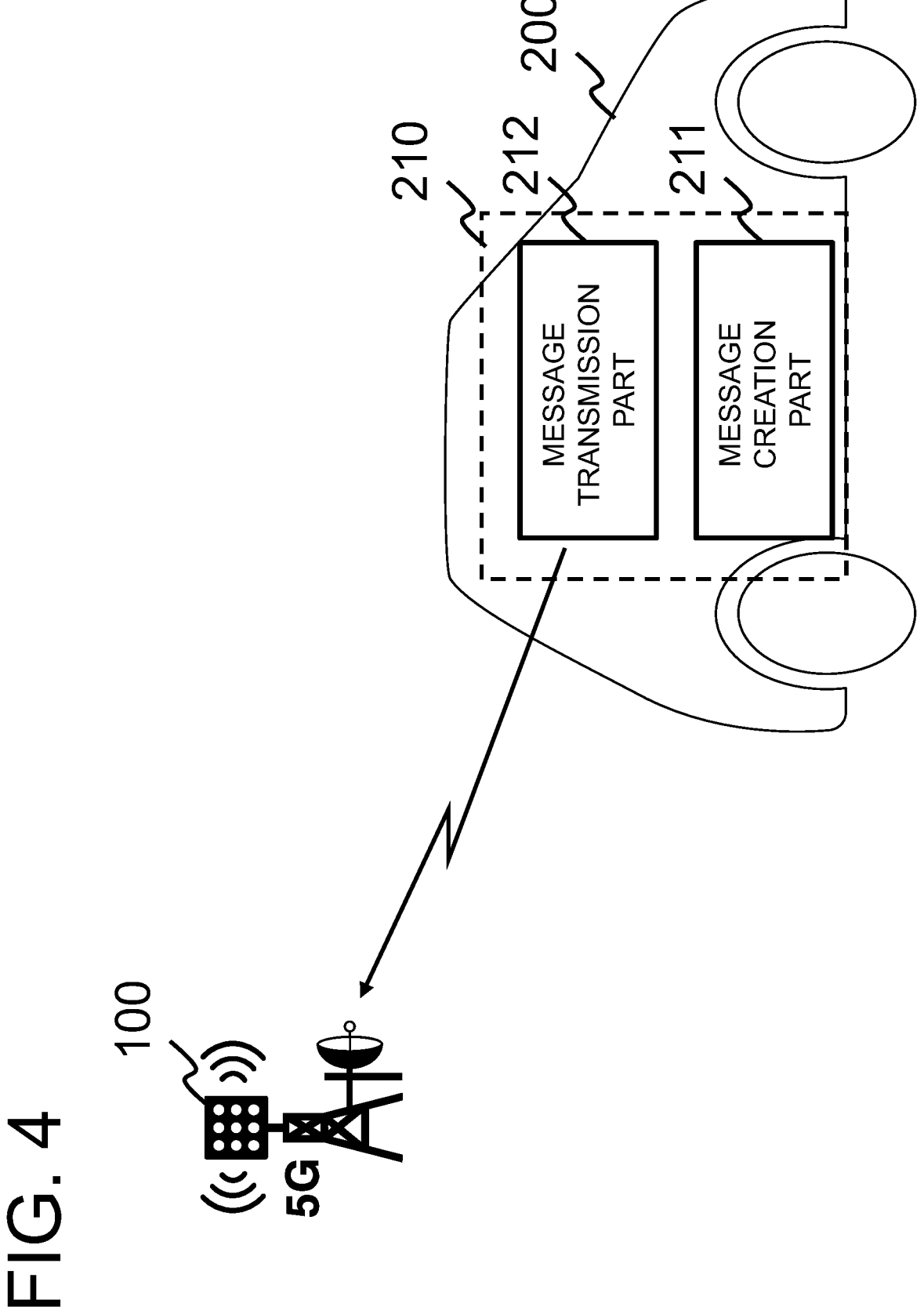
FIG. 4 is a diagram illustrating a configuration of a first example embodiment of the present invention.

A first example embodiment of the present invention will be described in detail with reference to the drawings. FIG. 4 is a diagram illustrating a configuration of a first example embodiment of the present invention. FIG. 4 illustrates a configuration including the base station 100 and the vehicle 200 provided with an onboard apparatus 210 that can transmit a message to the base station 100. The message includes message type information and is directed to an other mobile body such as an other vehicle.

The base station 100 is a base station that functions as a message relay apparatus. As such base station 100, a base station that supports 5th generation communication system (5G) and/or LTE (Long Term Evolution) can be used. The 5G and/or LTE is called C-V2X and is used to realize communication between vehicles and road infrastructure. In the following example embodiment, the base station 100 is described as a base station that supports 5G.

The onboard apparatus 210 mounted on the vehicle 200 is provided with a message creation part 211 and a message transmission part 212. The message creation part 211 operates when a predetermined event occurs to create a message directed to an other mobile body. The message includes information called message type that can be interpreted by an antenna selection part 102 (see FIG. 5) of the base station 100. It is possible to include information such as an occurrence of an accident, existence (or presence) of a fallen object, or a road damage in a body of the message.

The message transmission part 212 transmits the message created by the message creation part 211 to the base station 100. The message type will be described in detail later in FIG. 6.

Figure 5:
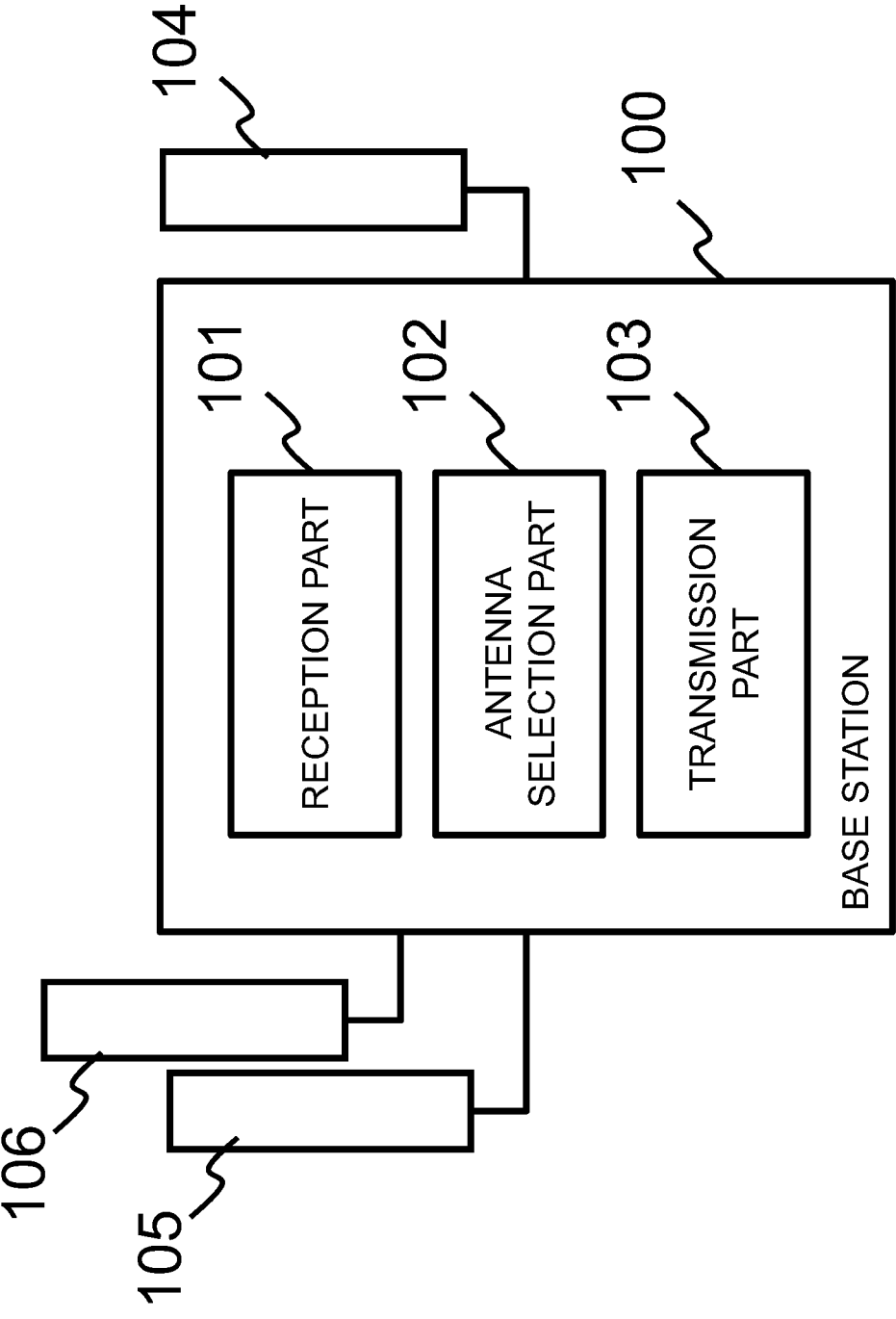
FIG. 5 is a diagram illustrating a configuration of a base station according to the first example embodiment of the present invention.
Figure 6:
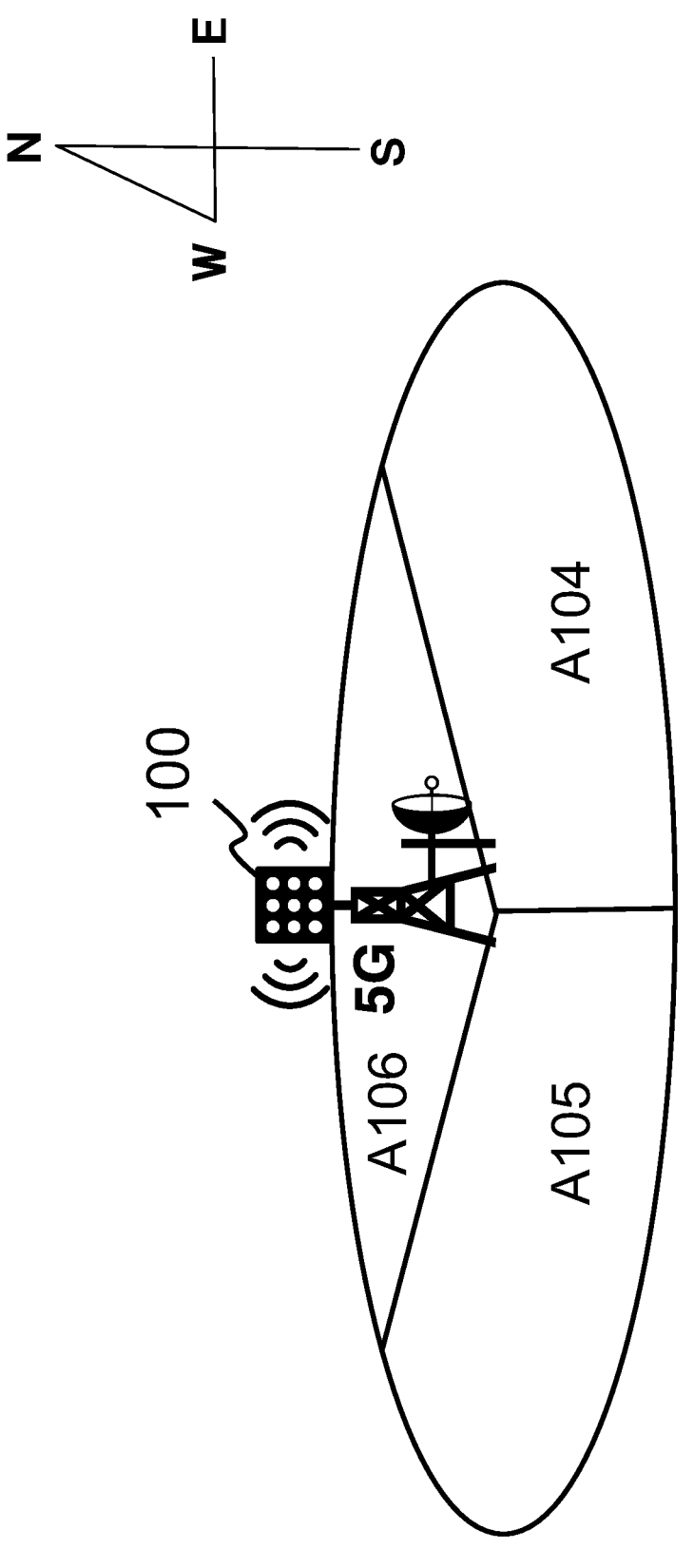
FIG. 6 is a diagram illustrating an arrangement of an antenna of the base station according to the first example embodiment of the present invention.

Next, a configuration of the base station 100 is described in detail with reference to FIG. 5 and FIG. 6. FIG. 5 is a diagram illustrating a configuration of a base station 100 according to the first example embodiment of the present invention. FIG. 5 illustrates a configuration provided with three antennas 104 to 106, a reception part 101, an antenna selection part 102 and a transmission part 103. In the present example embodiment, the antennas 104 to 106 are described as directional antennas, each having an angular coverage of approximately 120°. Concretely, as illustrated in FIG. 6, the antennas 104 to 106 are described as being able to transmit messages to areas (distribution areas) A104 to A106, respectively.

Upon receiving a message directed to an other mobile body from the vehicle 200, the reception part 101 notifies a combination of the message type included in a header thereof and an antenna that received the message (a reception antenna) to the antenna selection part 102.

The antenna selection part 102 selects transmission antenna according to information of the message type and the reception antenna, on a basis of preset setting information. The transmission part 103 broadcasts the message using the transmission antenna selected by the antenna selection part 102.

Figure 7:
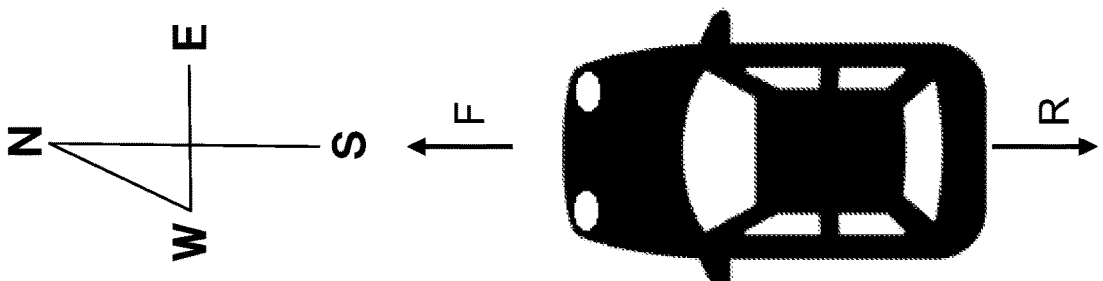
FIG. 7 is a diagram for describing a content of a message type that an onboard apparatus according to the first example embodiment of the present invention includes in a message.

As an example of information for indirectly specifying distribution request area information, a message type included in a message transmitted by the onboard apparatus 210 is described here. FIG. 7 is a diagram for describing a content of the message type that the onboard apparatus 210 according to the present example embodiment includes in a message. The message type according to the present example embodiment is configured with a combination of two information elements. A first information element indicates a traveling direction (absolute azimuth) of a vehicle, where "1" indicates east (E), "2" indicates north (N), "3" indicates west (W), and "4" indicates south (S). A second information element indicates a message transmission request direction as seen from the vehicle, where "1" indicates front (F) and "2" indicates rear (R). Therefore, a message type of 1-1 indicates that this is a message requesting a transmission to a front from a vehicle traveling east. Similarly, a message type of 1-2 indicates that this is a message requesting a transmission to a rear from a vehicle traveling east.

The base station 100 uses the antenna that received the message and the message type to select an antenna for transmitting the respective message. FIG. 8 is a diagram for describing a processing content for each message type of a message received by the base station 100 using the antenna 104, according to the first example embodiment of the present invention. When the message is received by the antenna 104, a vehicle transmitting the message (a source vehicle) is to be located in an area due south to northeast of the base station 100. When the base station 100 receives a message including the message types 1-1 from such a vehicle, the source vehicle is traveling eastward and the base station 100 is to be requested to transmit a message further ahead (or front) of the source vehicle. As illustrated in FIG. 6, since the base station 100 does not have an antenna capable of transmitting a message east of the distribution area A 104 of the antenna 104, the base station 100 is to discard the message of the message type 1-1. On the other hand, when the base station 100 receives a message including the message types 1-2, the source vehicle is traveling eastward and the base station 100 is to be requested to transmit a message to a rear of the source vehicle. As illustrated in FIG. 6, since the base station 100 has the antenna 105 capable of transmitting a message to an area A105 which is west of the distribution area A 104 of the antenna 104, it selects the antenna 105. Similarly, when the base station 100 receives a message including the message types 2-1, the source vehicle is traveling northward and the base station 100 is to be requested to transmit a message to a front of the source vehicle. As illustrated in FIG. 6, since the base station 100 has the antenna 106 capable of transmitting a message to an area A106 which is north of the distribution area A 104 of the antenna 104, it selects the antenna 106. On the other hand, when the base station 100 receives a message including the message types 2-2, the source vehicle is traveling northward and the base station 100 is to be requested to transmit a message to a rear of the source vehicle. As illustrated in FIG. 6, since the base station 100 does not have an antenna capable of transmitting a message east of a distribution area A 104 of the antenna 104, the base station 100 is to discards the message of the message type 2-2.

The above calculations are performed to create setting information for each reception antenna that defines an antenna to be selected (a selection antenna) for each message type and to store the setting information in the antenna selection part 102. This enables message transmission with less delay. FIG. 9 is a diagram illustrating an example of setting information set in the base station 100 according to the first example embodiment of the present invention. In the example illustrated in FIG. 9, in the setting information, for each reception antenna, the message type to be forwarded and the antenna to be selected (transmission antenna) for forwarding are defined. By using such setting information, it is possible to quickly determine the transmission antenna on a basis of a combination of the reception antenna and the message type. Note that when a combination is not defined in the setting information, the message is to be discarded, since it specifies an area where the base station 100 cannot transmit thereto as a distribution request area.

Figure 10:
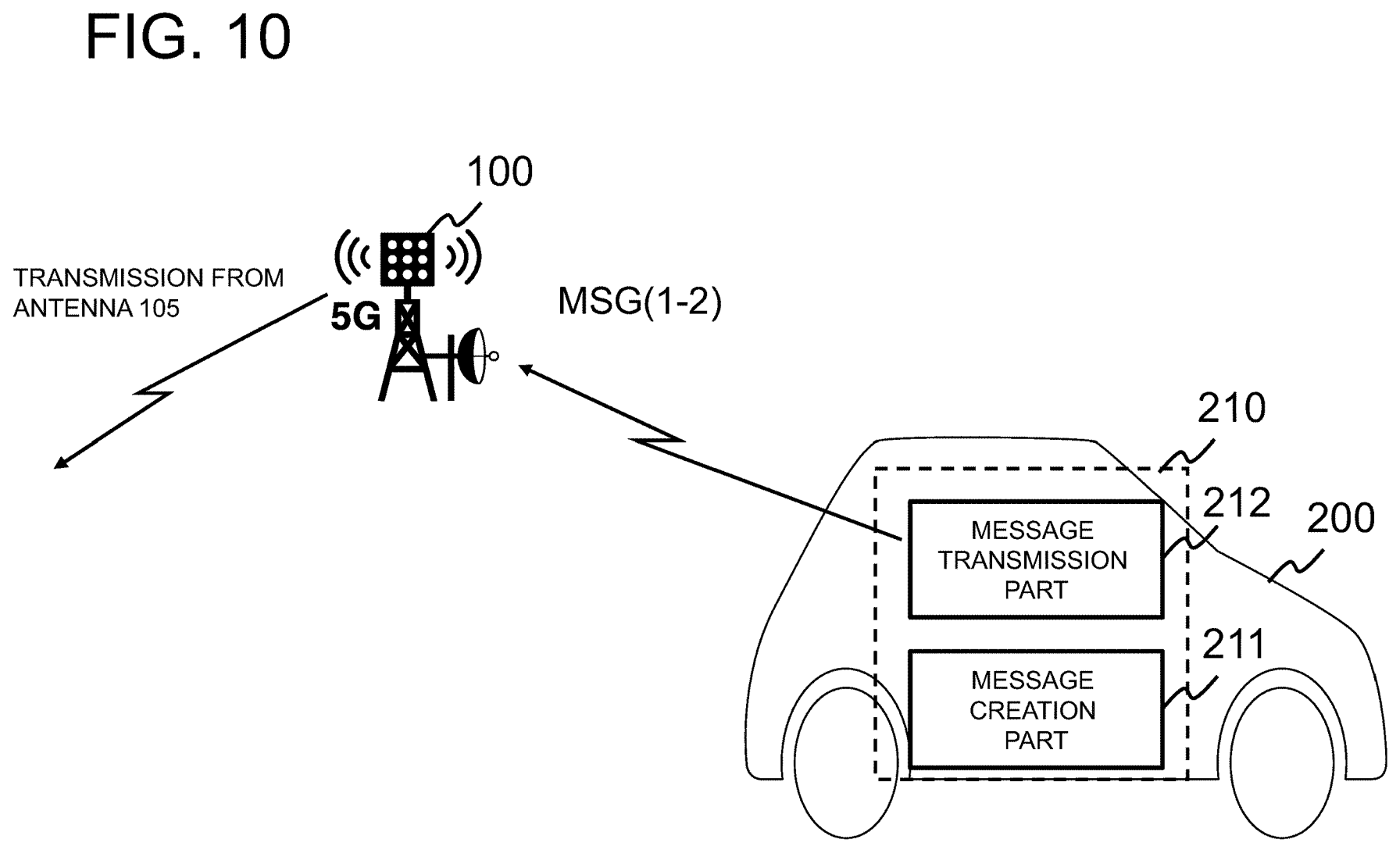
Figure 11:
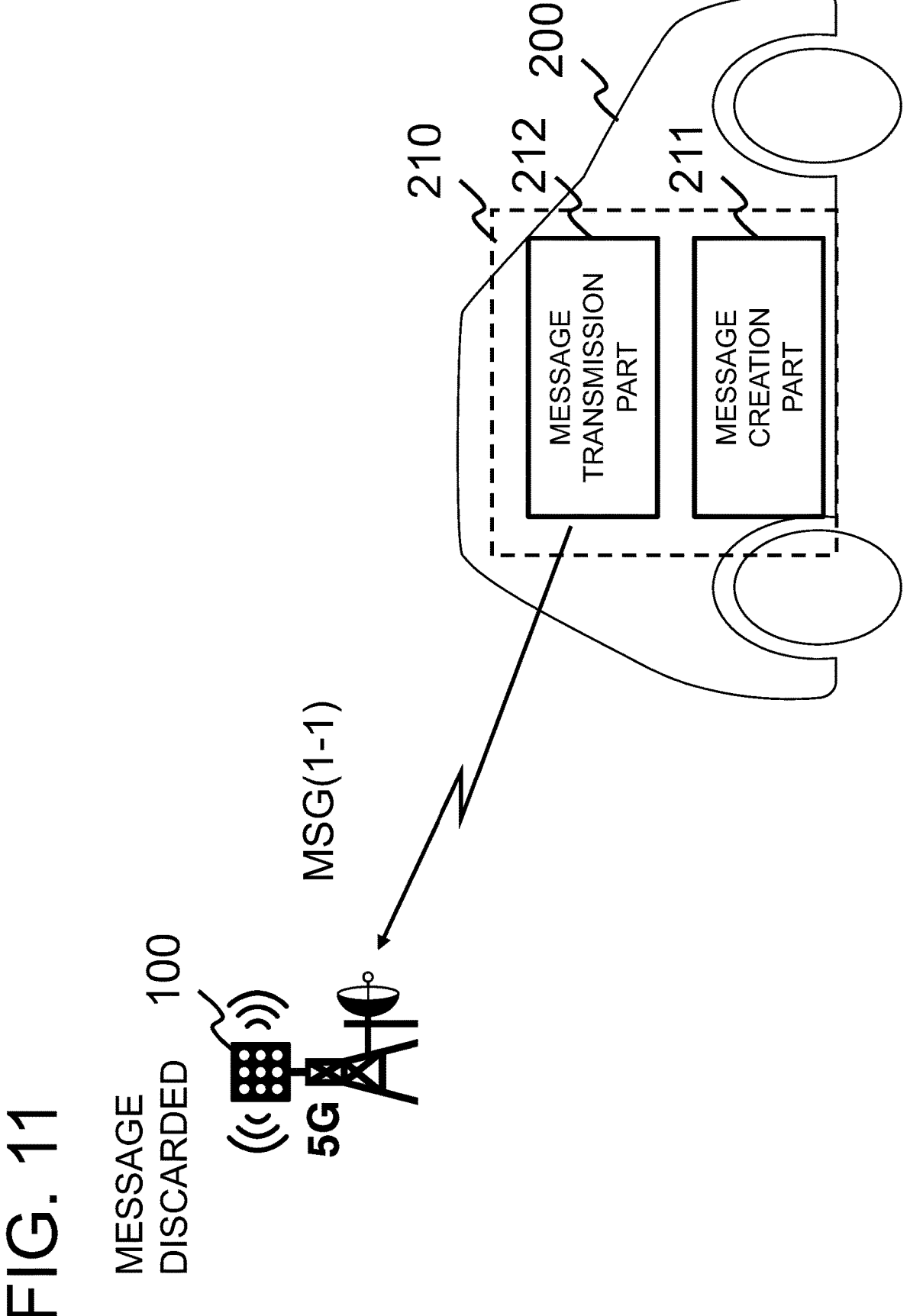
FIG. 11 is a diagram for describing an operation of the base station according to the first example embodiment of the present invention.

Next, an operation of the present example embodiment will be described in detail with reference to a drawing. FIG. 10 and FIG. 11 are diagrams for describing an operation of the base station 100 according to the first example embodiment of the present invention. FIG. 10 illustrates an operation when a vehicle 200 traveling east (E) at a location southeast of the base station 100 finds an accident in front thereof. In this case, the message creation part 211 of the onboard apparatus 210 in the vehicle 200 transmits a message MSG (1-2) including the message type 1-2 to the base station 100 to inform a following vehicle of an occurrence of an accident.

Upon receiving the message MSG (1-2), the base station 100 selects the antenna 105 as the transmission antenna for the message MSG (1-2), with reference to the setting information exemplified in FIG. 8. Then, the base station 100 broadcasts the message MSG (1-2), received from the vehicle 200, using the antenna 105 selected above. This allows the vehicle 200, located in the area A105 illustrated in FIG. 6, to receive the message MSG (1-2). In the above process, the transmission antenna 105 is selected on a basis of the message type included in the message MSG (1-2) without any calculation processing. Therefore, the transmission delay according to a scheme of the present example embodiment is smaller than that of a scheme disclosed in PTL 1, etc.

FIG. 11 illustrates an operation when a vehicle 200 traveling east (E) at a location southeast of the base station 100 finds an anomaly on a road it has already traveled. In this case, the message creation part 211 of the onboard apparatus 210 in the vehicle 200 transmits a message MSG (1-1) including the message type 1-1 to the base station 100 to inform an oncoming vehicle of an occurrence of the anomaly.

Upon receiving the message MSG (1-1), the base station 100 discards the received message MSG (1-1), without selecting the antenna, since a transmission antenna for the message MSG (1-1) is not defined in the setting information exemplified in FIG. 8. This avoids wasteful use of radio resources in the base station and surrounding vehicles.

As explained above, the present example embodiment makes it possible to transmission and reception of messages between vehicles in a mode of low transmission delay. In addition, as explained using FIG. 11, messages that cannot be transmitted to the requested area are discarded, thus avoiding the use of radio resources. This also reduces effects of delays and other problems when transmitting a message to be transmitted.

Second Example Embodiment

Figure 12:
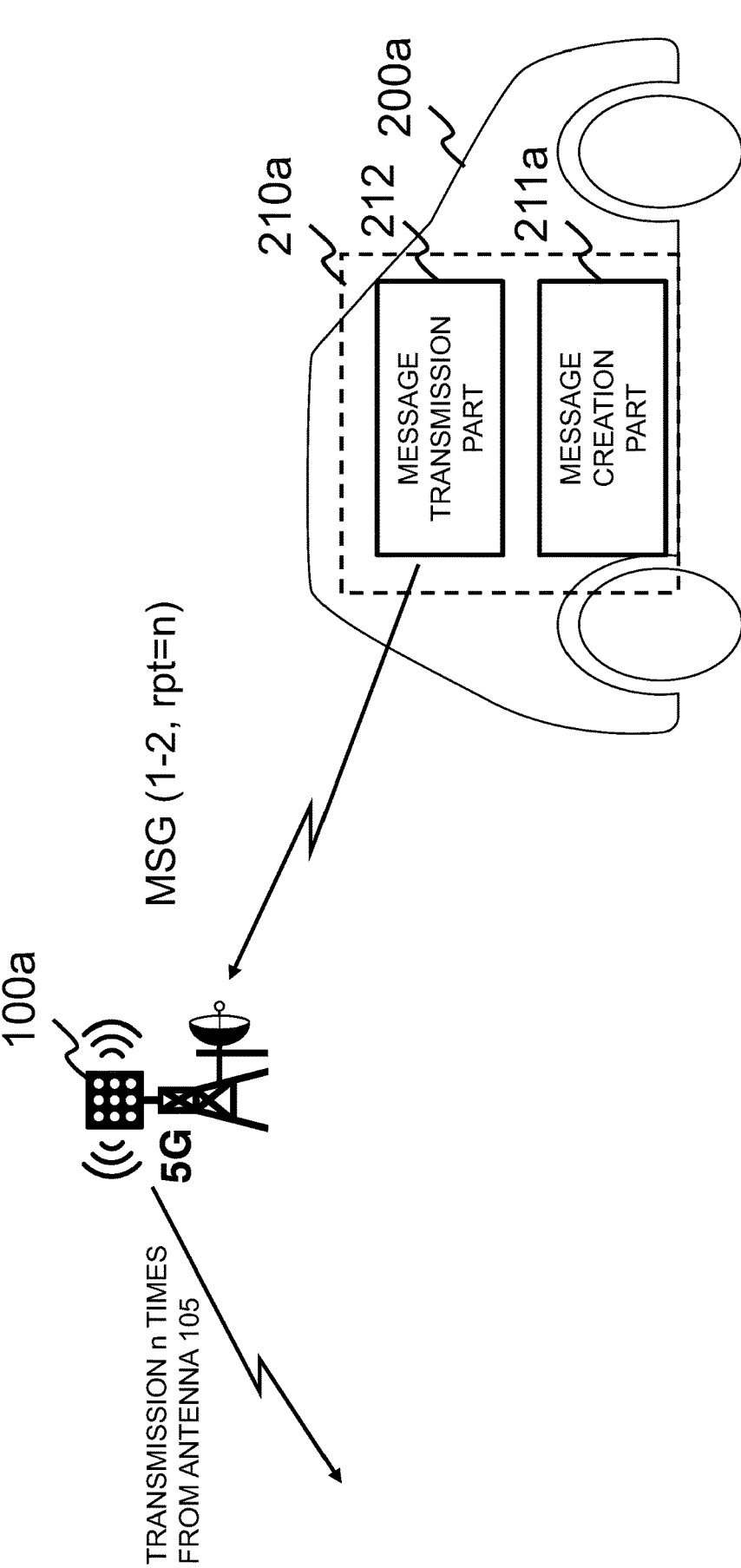
FIG. 12 is a diagram for describing an operation of a base station according to a second example embodiment of the present invention.

Next, with reference to the drawings, a second example embodiment is described in detail, which allows a number of repetition transmission times of a message to be set in a message. Since the second example embodiment can realize almost the same configuration as the first example embodiment, the following explanation will focus on the difference. FIG. 12 is a diagram for describing an operation of the base station according to the second example embodiment of the present invention.

A message creation part 211*a* of an onboard apparatus 210*a* according to the present example embodiment allows a number of repetition transmission times of a message to be specified to a message directed to other mobile bodies in addition to the message type.

Therefore, when a predetermined event occurs, the onboard apparatus 210*a* according to the present example embodiment transmits the message MSG (1-2, rpt=n) to the base station 100*a*. The message is directed to other mobile bodies and includes a message type and a number of repetition transmission times rpt of a message.

The base station 100*a*, which receives a message MSG (1-2, rpt=n) directed to the other mobile bodies and including the message type and the number of repetition transmission times rpt of a message, selects a transmission antenna on a basis of the message type therein similar to the first example embodiment. Then, the base station 100*a* repeatedly transmits messages to the other mobile bodies using the selected antenna for n times as defined in a number of repetition transmission times rpt. In this case, a predetermined time can be used for a transmission interval of messages.

According to the example embodiment, which operates as described above, it is possible to distribute a message from one vehicle to a large number of vehicles. In the above example embodiment, the transmission interval of messages is described as a predetermined time. However, the transmission interval of messages can be set arbitrarily by the vehicle 200*a* which transmits the messages. In this case, a message directed to other mobile bodies can include a transmission interval in addition to the message type and a number of repetition transmission times rpt of a message. Then a function to interpret the transmission interval may be added to the base station 100*a*.

The above example embodiment is explained with the example that the base station 100*a* repeatedly transmits on a basis of the number of repetition transmission times rpt set by the mobile body that transmits the message. However, a number of repetition transmission times rpt_i may be set in advance in the base station 100*a* to be applied to a vehicle-to-vehicle message. In this case, when the base station 100*a* receives a message directed to the other mobile bodies from the mobile body that transmits the message including a number of repetition transmission times rpt, it may change the number of repetition transmission times rpt_i to the number of repetition transmission times rpt.

Third Example Embodiment

Figure 13:
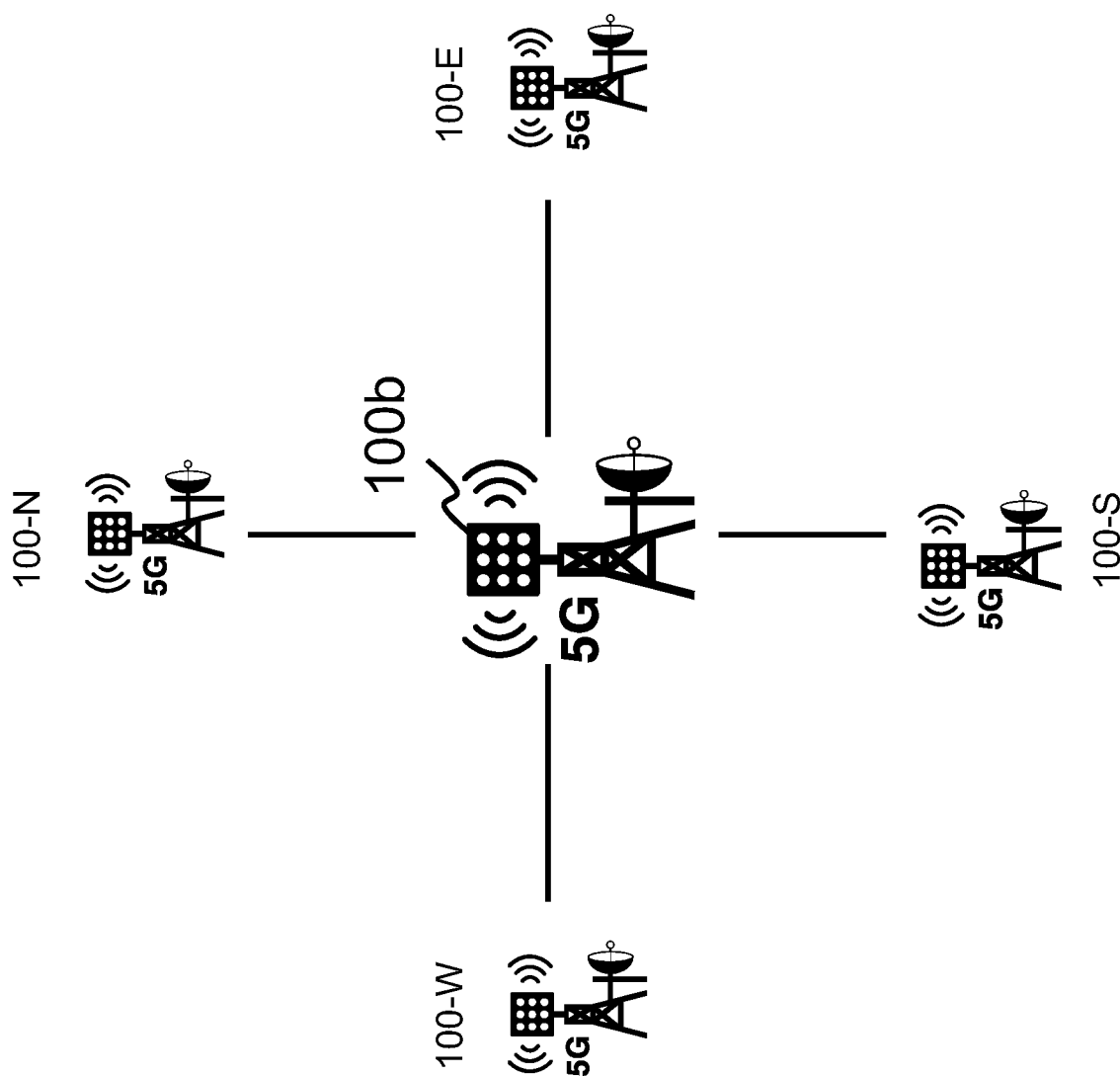
FIG. 13 is a diagram illustrating locational relationship between a base station and adjacent base stations, according to a third example embodiment of the present invention.

Next, with reference to the drawings, a third example embodiment is described in detail, which enables a plurality of base stations to cooperate to distribute a message to an appropriate area even if a distribution request area specified by a message type is an area where a single base station cannot transmit. FIG. 13 is a diagram illustrating locational relationship between a base station and adjacent base stations, according to the third example embodiment of the present invention. In the following example embodiment, it is described that adjacent base stations 100-N, 100-E, 100-S, and 100-W are assumed to be located to the east, west, south and north of the base station 100*b*, respectively, as illustrated in FIG. 13. Connections between the base station 100*b* and the adjacent base stations 100-N, 100-E, 100-S, and 100-W may be wired or wireless.

Each of the adjacent base stations 100-N, 100-E, 100-S, and 100-W is described as being provided with a function for transmitting a message upon receiving a message transmission request from the base station 100*b*.

FIG. 14 is a diagram for describing a processing content for each message type by the base station 100*b* according to the present example embodiment. A difference from a processing content for each message type illustrated in FIG. 8 is that the message types, which are defined not to select the transmission antenna in FIG. 8, are defined to request transmission of the message to the adjacent base station. For example, in an example illustrated in FIG. 8, when receiving a message including a message type 1-1, the base station 100*b* discards it. However, in an example illustrated in FIG. 14, the base station 100*b* requests transmission of the message to the adjacent base station 100-E located to the east thereof. Similarly, in an example illustrated in FIG. 8, when receiving a message including a message type 2-2, the base station 100*b* discards it. However, in an example illustrated in FIG. 14, the base station 100*b* requests transmission of the message to the adjacent base station 100S located to the south thereof.

Figure 15:
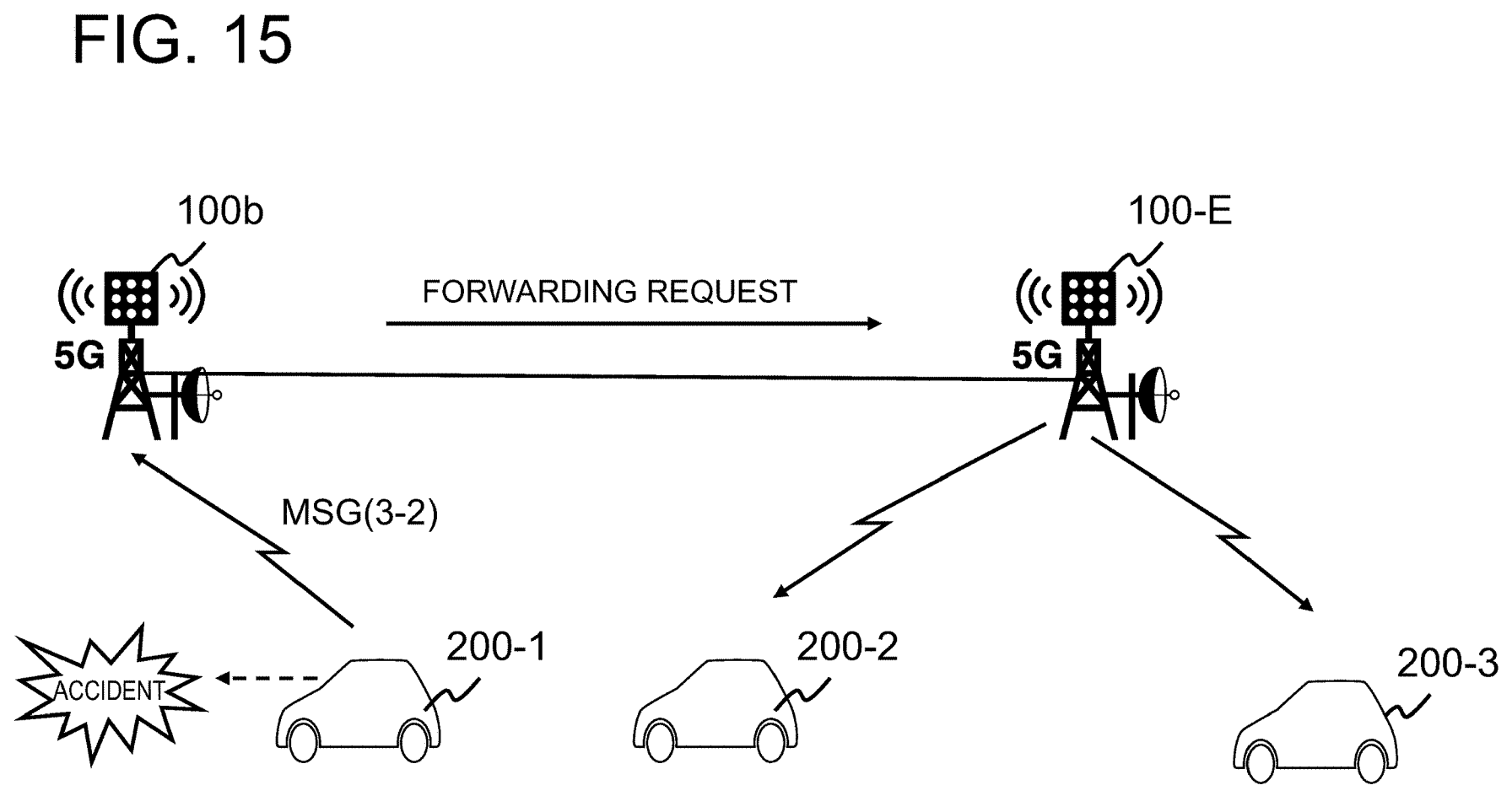

By using the setting information described above, the following operations are possible. FIG. 15 illustrates an operation when a vehicle 200-1 traveling west (W) at a location southeast of the base station 100*b* finds an accident in front thereof. In this case, the message creation part 211 of the onboard apparatus 210 in the vehicle 200-1 transmits a message MSG (3-2) including the message type 3-2 to the base station 100*b* to inform a following vehicle of an occurrence of the accident.

The base station 100*b*, which receives the message MSG (3-2), selects the adjacent base station 100-E as a transmission base station of the message MSG (3-2), with reference to the setting information exemplified in FIG. 14. Then, the base station 100*b* requests a broadcast of the message MSG (3-2) received from the vehicle 200-1 to the adjacent base station 100-E selected. The adjacent base station 100-E, which is requested by the base station 100*b*, performs a broadcast of the message MSG (3-2) received from the vehicle 200-1 requested therefrom. Thus, vehicles 200-2 and 200-3, which are following vehicles of the vehicle 200-1, can be informed quickly about an accident that has occurred in front of them, as illustrated in FIG. 15.

Figure 16:
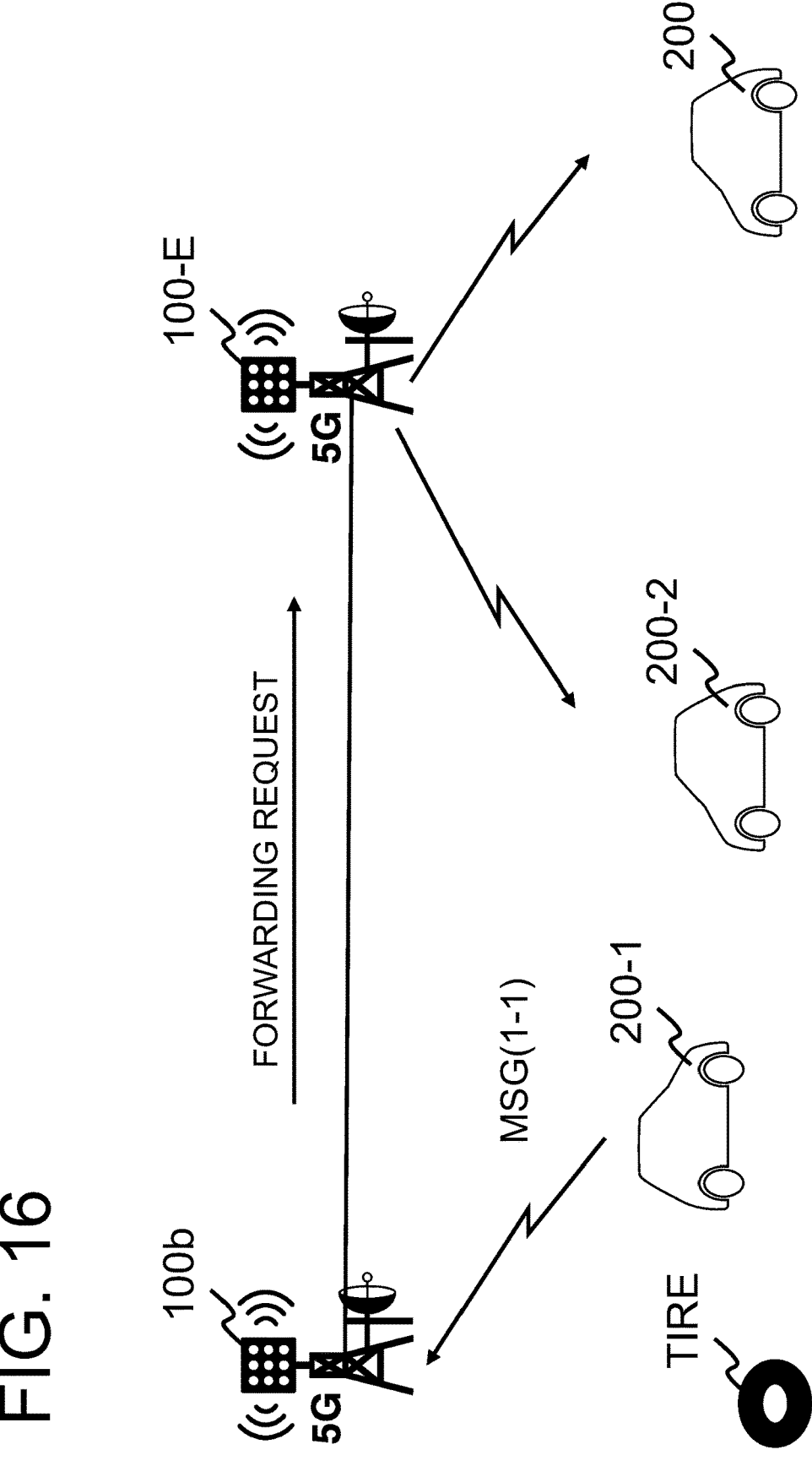
FIG. 16 is a diagram for describing an operation of the base station according to the third example embodiment of the present invention.

FIG. 16 illustrates an operation when a vehicle 200-1 traveling east (E) at a location southeast of the base station 100*b* finds a foreign object (TIRE) falling on a opposite traffic lane which traveling. In this case, the message creation part 211 of the onboard apparatus 210 in the vehicle 200-1 transmits a message MSG (1-1) including the message type 1-1 to the base station 100b to inform an oncoming vehicle of an existence of the foreign object.

The base station 100b, which receives the message MSG (1-1), selects the adjacent base station 100-E as a transmission base station of the message MSG (1-1), with reference to the setting information exemplified in FIG. 14. Then, the base station 100b request a broadcast of the message MSG (1-1) received from the vehicle 200-1 to the adjacent base station 100-E selected. The adjacent base station 100-E, which is requested by the base station 100b, performs a broadcast of the message MSG (1-1) received from the vehicle 200-1 requested therefrom. Thus, vehicles 200-2 and 200-3, which travel on the opposite traffic lane from the vehicle 200-1, can be informed quickly of the existence of the fallen object, as illustrated in FIG. 16.

According to the example embodiment, which operates as described above, it is possible to forward messages over a wider area. In the above example embodiment, the adjacent base station 100-E is described as not specifically selecting an antenna. However, it is possible to have the adjacent base station 100-E also select an antenna using the message type. For example, in FIG. 15, when the adjacent base station 100-E is requested from the base station 100b to transmit a message of the message type 3-2, it can be configured to select a specific antenna of the adjacent base station 100-E and transmit the message only to the vehicle 200-2.

In the above example embodiment, when selecting an adjacent base station, it is described that the base station 100b does not consider a distance to the adjacent base station. However, when selecting an adjacent base station, the base station 100b may decide whether or not a transmission of a message is required taking into account the distance to the adjacent base station. For example, when the distance to the adjacent base station is several kilometers or more, depending on a content of a message, there may be no need to inform or the warning may be less effective. In such a case, it is preferable for the base station 100b to decide whether or not to request an adjacent base station to transmit a message, taking into account a content of the message and/or a distance to the adjacent base station.

While example embodiments of the present invention have thus been described, the present invention is not limited thereto. Further variations, substitutions, or adjustments can be made without departing from a basic technical concept of the present invention. For example, the configurations of the networks, the configurations of the elements, and the representation modes of the data illustrated in the drawings have been used only as examples to facilitate understanding of the present invention. That is, the present invention is not limited to the configurations illustrated in the drawings.

In the above embodiments, it is described that a total of 8 message types are used, each message type including a traveling direction (absolute azimuth) of the own vehicle and a message transmission request direction (two values of front and rear) as seen from the vehicle. However, the form of expression of the message type is not limited to this. For example, if a traveling direction of a vehicle is substantially two directions such as on a highway, the traveling direction (absolute azimuth) of the own vehicle has two values. In addition to a message transmission request direction (two values of front and rear), it may also be possible to specify the left/right direction and distance from the own vehicle. For example, when specifying the distance from the own vehicle, it may be possible to specify "rear, 300 to 1000 m distance from the own vehicle" and so on. In this case, setting information corresponding to the message types can also be set for the antenna selection part of the message relay apparatus (base station).

In the above example embodiment, a vehicle was assumed as a mobile body, but the present invention can also be applied to relay messages between pedestrians, flying objects (drones), etc.

The above example embodiment is explained with the example that a base station has three antennas. However, there is no limit to the number of antennas as long as there are 2 or more. The above example embodiment is explained with the example that a base station is used as a message relay apparatus. However, the message apparatus may be a roadside device or other communication device such as a wireless access point, etc.

Figure 17:
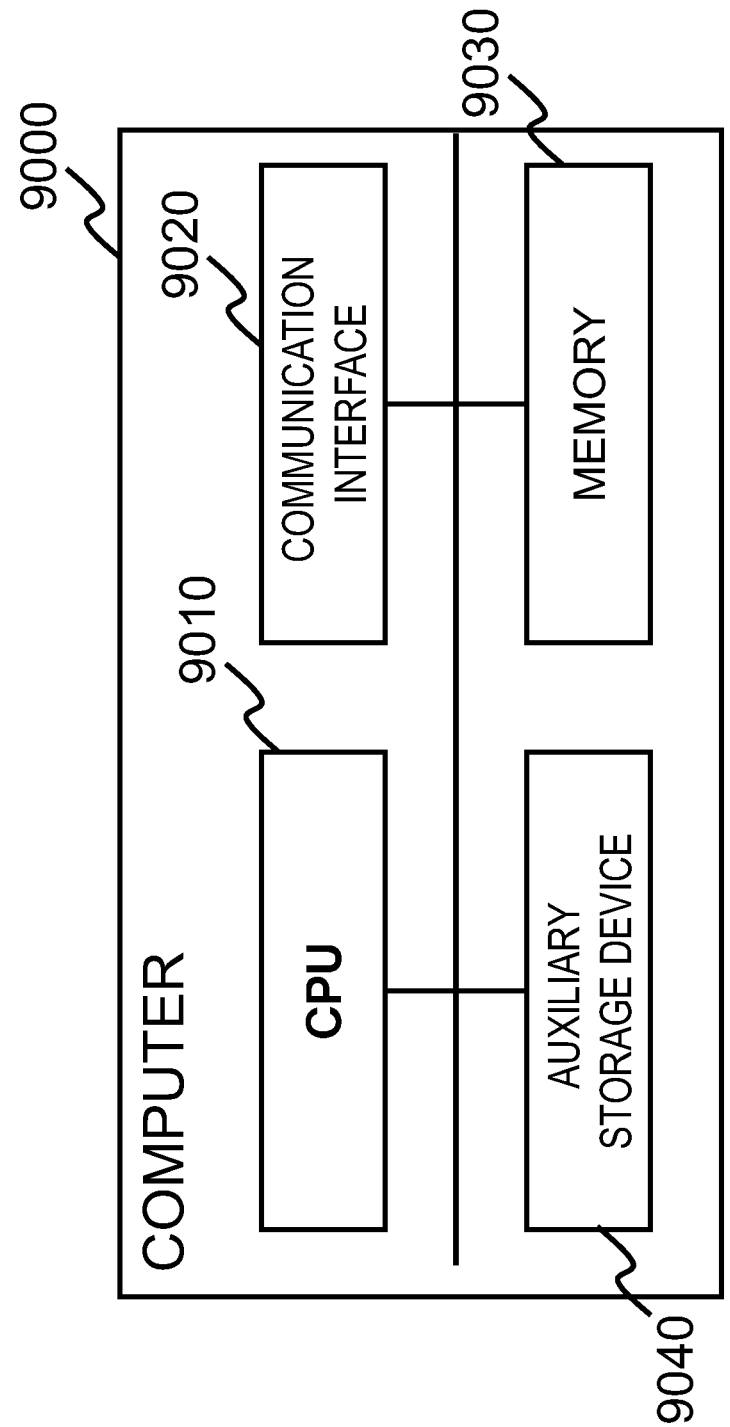
FIG. 17 is a diagram illustrating a configuration of a computer installed on a message relay apparatus or an onboard apparatus of the present invention.

Each of the procedures described in the first to third example embodiments above can be realized by a program that causes a computer (9000 in FIG. 17), which functions as a base station and/or an onboard apparatus of a vehicle, to realize a function as each apparatus. This computer is exemplified in FIG. 17 in a configuration with a CPU (Central Processing Unit) 9010, a communication interface 9020, a memory 9030, and an auxiliary storage device 9040. That is, the CPU 9010 in FIG. 17 performs a transmission program for message and/or a forwarding program for message and performs processing for updating various calculation parameters stored in the auxiliary storage device 9040, etc.

That is, each part (processing means and functions) of each device illustrated in the first to third example embodiments above can be realized by a computer program that causes the processor in these devices to execute each of the above processes using its hardware.

Finally, suitable modes of the present invention will be summarized. The whole part of the example embodiments disclosed above can be described as, but not limited to, the following supplementary notes termed as "Modes".

[Mode 1]
(See the message relay apparatus according to the first aspect)

[Mode 2]
In the above message relay apparatus, when the antenna selection part does not select the selection antenna on a basis of the setting information, the message relay apparatus can be configured to discards the message.

[Mode 3]
In the above message relay apparatus, the distribution request area information can be information that specifies transmission areas of the first antenna and the second antenna of the message relay apparatus, respectively; and the antenna selection part can be configured to select the selection antenna that corresponds to the transmission area.

[Mode 4]
In the above message relay apparatus, the distribution request area information can be information that includes a traveling direction of the first mobile body and a transmission request direction with reference to a location of the first mobile body, and the antenna selection part can be configured to select an antenna that can transmit the message as the selection antenna on a basis of the setting information, the setting information defines the antenna for transmission using a combination of the distribution request area information and the antenna through which the message is received.

13

[Mode 5]
In the above message relay apparatus,
the antenna selection part can be configured to selects the second antenna as the selection antenna when the first mobile body located in the first direction is in either a first case or a second case, the first case being that the first mobile body is traveling in the first direction and a transmission request direction of a message is the second direction, the second case being that the first mobile body is traveling in the second direction and the transmission request direction of a message is the first direction; and
the antenna selection part can be configured to selects the first antenna as the selection antenna when the first mobile body located in the second direction is in either a third case or a fourth case, the third case being that the first mobile body is traveling in the second direction and the transmission request direction of a message is the first direction, the fourth case being that the first mobile body is traveling in the first direction and the transmission request direction of a message is the second direction.

[Mode 6]
In the above message relay apparatus, a number of transmission request times can be set in the message, and
the transmission part can be configured to repeat transmission of the message for a number of times specified in the number of transmission request times at a predetermined time interval.

[Mode 7]
In the above message relay apparatus, the message relay apparatus can be configured to be connected to adjacent message relay apparatuses adjacent to the message relay apparatus, and
the message relay apparatus can be configured to request transmission of the message to an adjacent relay apparatus located in a direction defined in the distribution request area information.

[Mode 8]
(See the onboard apparatus according to the second aspect)
[Mode 9]
(See the communication system according to the third aspect)
[Mode 10]
(See the message relay method according to the fourth aspect)
[Mode 11]
(See the message relay method according to the fifth aspect)
[Mode 12]
(See the programs according to the sixth aspect)
The above modes 8 to 12 can be expanded in the same way as mode 1 is expanded to modes 2 to 7.

The disclosure of each of the above Patent Literatures is incorporated herein by reference thereto and may be used as the basis or a part of the present invention, as needed. Modifications and adjustments of the example embodiments and examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST

10: message relay apparatus
11, 101: reception part
12, 102: antenna selection part
13, 103: transmission part
14: first antenna
15: second antenna
20: mobile body
100: base station
200, 200a, 200-1~200-3: vehicle
210, 210a: onboard apparatus
211, 211a: message creation part
212: message transmission part
100, 100a, 100b: base station
100-E, 100-N, 100-W, 100-S: adjacent base station
104-106: antenna
9000: computer
9010: CPU
9020: communication interface
9030: memory
9040: auxiliary storage device

What is claimed is:
1. A message relay apparatus, comprising:
a first antenna that has a directivity in a first direction;
a second antenna that has a directivity in a second direction different from the first direction;
at least a processor; and
a memory in circuit communication with the processor,
wherein the processor is configured to execute program instructions stored in the memory to:
receive a message from a first mobile body, the message being directed to a second mobile body and including distribution request area information;
select an antenna from the first antenna and the second antenna on a basis of setting information for each antenna through which the message is received, the setting information including a relationship between an antenna to be selected and a distribution request area indicated in the distribution request area information;
transmit the received message using the selected antenna; and
discard the received message in a case that no antenna is selected.
2. The message relay apparatus according to claim 1, wherein
the distribution request area information is information specifying transmission areas of the first antenna and the second antenna of the message relay apparatus; and
the processor is configured to execute the program instructions to
select the antenna that corresponds to a transmission area.
3. The message relay apparatus according to claim 1, wherein
the distribution request area information is information including a traveling direction of the first mobile body and a transmission request direction with reference to a location of the first mobile body.

4. The message relay apparatus according to claim 1, wherein the distribution request area information is information specifying transmission areas of the first antenna and the second antenna of the message relay apparatus; and the processor is configured to execute the program instructions to select the antenna that corresponds to a transmission area.

5. The message relay apparatus according to claim 1, wherein the distribution request area information is information including a traveling direction of the first mobile body and a transmission request direction with reference to a location of the first mobile body.

6. The message relay apparatus according to claim 1, wherein the processor is configured to execute the program instructions to:

select the second antenna in either a first case or a second case, the first case being that the first mobile body is traveling in the first direction and a transmission request direction of a message is the second direction, the second case being that the first mobile body is traveling in the second direction and the transmission request direction of a message is the first direction; and select the first antenna in either a third case or a fourth case, the third case being that the first mobile body is traveling in the second direction and the transmission request direction of a message is the first direction, the fourth case being that the first mobile body is traveling in the first direction and the transmission request direction of a message is the second direction.

7. The message relay apparatus according to claim 2, wherein the processor is configured to execute the program instructions to:

select the second antenna in either a first case or a second case, the first case being that the first mobile body is traveling in the first direction and a transmission request direction of a message is the second direction, the second case being that the first mobile body is traveling in the second direction and the transmission request direction of a message is the first direction; and select the first antenna in either a third case or a fourth case, the third case being that the first mobile body is traveling in the second direction and the transmission request direction of a message is the first direction, the fourth case being that the first mobile body is traveling in the first direction and the transmission request direction of a message is the second direction.

8. The message relay apparatus according to claim 3, wherein the processor is configured to execute the program instructions to:

select the second antenna in either a first case or a second case, the first case being that the first mobile body is traveling in the first direction and a transmission request direction of a message is the second direction, the second case being that the first mobile body is traveling in the second direction and the transmission request direction of a message is the first direction; and select the first antenna in either a third case or a fourth case, the third case being that the first mobile body is traveling in the second direction and the transmission request direction of a message is the first direction, the fourth case being that the first mobile body is traveling in the first direction and the transmission request direction of a message is the second direction.

9. The message relay apparatus according to claim 1, wherein the message includes a number of transmission request times, and the processor is further configured to execute the program instructions to repeat transmission of the message for a number of times specified in the number of transmission request times at a predetermined time interval.

10. The message relay apparatus according to claim 2, wherein the message includes a number of transmission request times, and the processor is further configured to execute the program instructions to repeat transmission of the message for a number of times specified in the number of transmission request times at a predetermined time interval.

11. The message relay apparatus according to claim 3, wherein the message includes a number of transmission request times, and the processor is further configured to execute the program instructions to repeat transmission of the message for a number of times specified in the number of transmission request times at a predetermined time interval.

12. A message relay apparatus, comprising:

a first antenna that has a directivity in a first direction;

a second antenna that has a directivity in a second direction different from the first direction;

at least a processor; and a memory in circuit communication with the processor, wherein the processor is configured to execute program instructions stored in the memory to:

receive a message from a first mobile body, the message being directed to a second mobile body and including distribution request area information;

select an antenna from the first antenna and the second antenna on a basis of setting information for each antenna through which the message is received, the setting information including a relationship between an antenna to be selected and a distribution request area indicated in the distribution request area information;

transmit the received message using the selected antenna;

select the second antenna in either a first case or a second case, the first case being that the first mobile body is traveling in the first direction and a transmission request direction of a message is the second direction, the second case being that the first mobile body is traveling in the second direction and the transmission request direction of a message is the first direction; and select the first antenna in either a third case or a fourth case, the third case being that the first mobile body is traveling in the second direction and the transmission request direction of a message is the first direction, the fourth case being that the first mobile body is traveling in the first direction and the transmission request direction of a message is the second direction.

13. An onboard apparatus, comprising:

a transmitter for transmitting a message directed to a second mobile body to the message relay apparatus according to claim 1, the message including distribution request area information.

14. The onboard apparatus according to claim 13, wherein the onboard apparatus can transmit a message directed to the second mobile body and including information specifying transmission areas of the first antenna and the second antenna of the message relay apparatus, as the distribution request area information.

15. The onboard apparatus according to claim 13, wherein the onboard apparatus can transmit a message directed to the second mobile body and including information as the distribution request area information, the information including a traveling direction of the first mobile body and a transmission request direction with reference to a location of the first mobile body.

16. A communication system, comprising:
a message relay apparatus according to claim 1; and
an onboard apparatus,
wherein the onboard apparatus comprises a transmitter for transmitting message directed to the second mobile body and including the distribution request area information.

17. The message relay apparatus according to claim 12, wherein
the message includes a number of transmission request times, and
the processor is further configured to execute the program instructions to
repeat transmission of the message for a number of times specified in the number of transmission request times at a predetermined time interval.

18. A message relay apparatus, comprising:
a first antenna that has a directivity in a first direction;
a second antenna that has a directivity in a second direction different from the first direction;
at least a processor; and
a memory in circuit communication with the processor,
wherein the processor is configured to execute program instructions stored in the memory to:
receive a message from a first mobile body, the message being directed to a second mobile body and including distribution request area information;
select an antenna from the first antenna and the second antenna on a basis of setting information for each antenna through which the message is received, the setting information including a relationship between an antenna to be selected and a distribution request area indicated in the distribution request area information; and
transmit the received message using the selected antenna, wherein
the message includes a number of transmission request times, and
the processor is further configured to execute the program instructions to
repeat transmission of the message for a number of times specified in the number of transmission request times at a predetermined time interval.

19. A message relay apparatus, comprising:
a first antenna that has a directivity in a first direction;
a second antenna that has a directivity in a second direction different from the first direction;
at least a processor; and
a memory in circuit communication with the processor,
wherein the processor is configured to execute program instructions stored in the memory to:
receive a message from a first mobile body, the message being directed to a second mobile body and including distribution request area information;
select an antenna from the first antenna and the second antenna on a basis of setting information for each antenna through which the message is received, the setting information including a relationship between an antenna to be selected and a distribution request area indicated in the distribution request area information; and
transmit the received message using the selected antenna, wherein
the message relay apparatus is connected to adjacent message relay apparatuses, and
the processor is further configured to execute the program instructions to request transmission of the message to an adjacent relay apparatus located in a direction defined in the distribution request area information.

* * * * *